US012294263B2

(12) United States Patent
Omagari et al.

(10) Patent No.: US 12,294,263 B2
(45) Date of Patent: May 6, 2025

(54) STATOR COIL FOR ELIMINATING TORQUE UNEVENESS

(71) Applicant: HONDA MOTOR CO., LTD., Tokyo (JP)

(72) Inventors: Kenichi Omagari, Tokyo (JP); Masashi Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 220 days.

(21) Appl. No.: 18/050,050

(22) Filed: Oct. 27, 2022

(65) Prior Publication Data
US 2023/0155434 A1 May 18, 2023

(30) Foreign Application Priority Data

Nov. 17, 2021 (JP) .................. 2021-186935

(51) Int. Cl.
*H02K 3/12* (2006.01)
*H02K 1/16* (2006.01)
(52) U.S. Cl.
CPC .............. *H02K 3/12* (2013.01); *H02K 1/16* (2013.01)
(58) Field of Classification Search
CPC .................................. H02K 1/16; H02K 3/12
USPC ........................................................ 310/208
See application file for complete search history.

(56) References Cited

U.S. PATENT DOCUMENTS

| 8,760,019 | B2* | 6/2014 | Mori | ........................ B60L 50/15 310/71 |
| 2013/0113330 | A1 | 5/2013 | Saito et al. | |
| 2016/0241100 | A1 | 8/2016 | Ito | |
| 2018/0006516 | A1* | 1/2018 | Tachikawa | .............. H02K 1/165 |
| 2020/0028397 | A1* | 1/2020 | Sakuma | ................... H02K 21/14 |
| 2020/0395804 | A1 | 12/2020 | Ahmed et al. | |
| 2021/0305855 | A1* | 9/2021 | Sakuma | ................... H02K 1/165 |
| 2021/0305868 | A1* | 9/2021 | Sakuma | ................... H02K 21/16 |
| 2022/0069651 | A1* | 3/2022 | Saito | ......................... B60L 50/51 |

(Continued)

FOREIGN PATENT DOCUMENTS

JP 2010130842 A 6/2010
JP 2012029370 A 2/2012
(Continued)

OTHER PUBLICATIONS

Notification of Reasons for Refusal issued in the JP Patent Application No. 2021-186935, mailed on May 30, 2023.

*Primary Examiner* — Rashad H Johnson
(74) *Attorney, Agent, or Firm* — CKC & Partners Co., LLC

(57) ABSTRACT

A stator coil including a continuous three-phase coil group the linear portions in the linear portion groups of the respective phases being arranged side by side in order in the continuous three-phase coil group, wherein in each of first slots that are every other slots from among the slots, the linear portions of a same phase are accommodated in order and stacked in a radial direction of the stator core, and in each of second slots that are every other slots different from the first slots from among the slots, the linear portions of two phases that are same as two phases of the linear portions in the first slots on opposite sides of the second slot are accommodated in a number of layers stacked, the number being equal to a number of layers stacked in the first slots, and stacked in the radial direction of the stator core.

2 Claims, 12 Drawing Sheets

(56) References Cited

U.S. PATENT DOCUMENTS

| | | | | |
|---|---|---|---|---|
| 2022/0140681 A1* | 5/2022 | Uga | ............... | H02K 3/28 |
| | | | | 310/198 |
| 2022/0360128 A1* | 11/2022 | Reuter | ............ | H02K 3/28 |
| 2022/0368186 A1* | 11/2022 | Reuter | ............ | H02K 3/12 |
| 2023/0155434 A1* | 5/2023 | Omagari | ......... | H02K 3/12 |
| | | | | 310/208 |
| 2023/0179054 A1 | 6/2023 | Ito | | |
| 2023/0318380 A1* | 10/2023 | Bai | ............... | H02K 3/28 |
| | | | | 310/208 |

FOREIGN PATENT DOCUMENTS

| | | | |
|---|---|---|---|
| JP | 2015126630 A | 7/2015 |
| JP | 2015154582 A | 8/2015 |
| JP | 5915151 B2 | 5/2016 |
| JP | 2016152730 A | 8/2016 |
| JP | 2017017838 A | 1/2017 |
| JP | 2020080598 A | 5/2020 |
| WO | 2021220940 A1 | 11/2021 |

\* cited by examiner

STATOR COIL FOR ELIMINATING TORQUE UNEVENESS

This application is based on and claims the benefit of priority from Japanese Patent Application No. 2021-186935, filed on 17 Nov. 2021, the content of which is incorporated herein by reference.

BACKGROUND OF THE INVENTION

Field of the Invention

The present invention relates to a stator coil.

Related Art

Conventionally, a technique in which a continuous coil having three phases, a U-phase, a V-phase and a W-phase, is inserted into slots of a stator core to arrange coils of the respective phases along a circumferential direction of the stator core has been known (see, for example, Patent Document 1).

Patent Document 1: Japanese Patent No. 5915151

SUMMARY OF THE INVENTION

In the conventional coil above, linear portions of a coil of each phase, which are inserted in slots, are arranged side by side in units of two slots adjacent to each other in the circumferential direction of the stator core. Therefore, when this coil is mounted on the stator core by being wound in a plurality of layers, linear portions of a same phase are disposed in such a manner as to be concentrated on the adjacent two slots. In the stator thus obtained, the U-phase, the V-phase and the W-phase shift from one to another in order on a two slot-by-two slot basis along the circumferential direction.

However, a rotating electrical machine including such a stator has the problem of large torque variation among the phases during rotor rotation, causing rotating torque unevenness to easily occur.

An object of the present invention is to provide a stator coil that can eliminate rotating torque unevenness by curbing torque variation among phases during rotor rotation and thus enables provision of a high-quality rotating electrical machine.

(1) A stator coil according to the present invention is a stator coil (for example, a later-described stator coil 3, 3A, 3B) including a continuous three-phase coil group (for example, a later-described three-phase coil group 310) including a linear portion group (for example, a later-described linear portion group 314) in which linear portions (for example, later-described linear portions 311) are arranged side by side in units of two adjacent slots of slots (for example, later-described slots 22) of a stator core (for example, a later-described stator core 2) for each of three phases (for example, a U-phase, a V-phase and a W-phase, which will be described later), the linear portions in the linear portion groups of the respective phases being arranged side by side in order in the continuous three-phase coil group, the stator coil being mounted on the stator core by being wound in a plurality of layers along a circumferential direction (for example, a later-described circumferential direction Y) of the stator core, wherein in each of first slots (for example, later-described first slots 22A) that are every other slots from among the slots of the stator core, the linear portions of a same phase are accommodated in order and stacked in a radial direction (for example, a later-described radial direction Z) of the stator core, and in each of second slots (for example, later-described second slots 22E) that are every other slots different from the first slots from among the slots of the stator core, the linear portions of two phases that are same as two phases of the linear portions in the first slots on opposite sides of the second slot are accommodated in a number of layers stacked, the number being equal to a number of layers stacked in the first slots, and stacked in the radial direction of the stator core.

(2) In the stator coil according to (1) above, in a part corresponding to a boundary portion (for example, a later-described boundary portion 310c) between a first half portion (for example, a later-described outer circumferential-side coil group 310a) and a second half portion (for example, a later-described inner circumferential-side coil group 310b) of a number of turns of the three-phase coil group around the stator core, a pitch of each of the linear portion groups may be one slot longer or shorter than a basic pitch (for example, a later-described six-slot pitch) of each of the linear portion groups in another part.

(3) In the stator coil according to (1) above, a long pitch portion (for example, later-described long pitch portions Pa) in which a pitch of each of the linear portion groups is one slot longer than a basic pitch (for example, a later-described six-slot pitch) and a short pitch portion (for example, later-described short pitch portions Pb) in which the pitch of each of the linear portion groups is one slot shorter than the basic pitch may alternately be disposed over an entirety in a longitudinal direction of the three-phase coil group.

(4) In the stator coil according to (1) above, in a winding portion (for example, a later-described second turn) at a center in the radial direction of the stator core in a number of turns of the three-phase coil group around the stator core, a long pitch portion (for example, later-described long pitch portions Pa) in which a pitch of each of the linear portion groups is one slot longer than a basic pitch (for example, a later-described six-slot, pitch) and a short pitch portion (for example, later-described short pitch portions Pb) in which the pitch of each of the linear portion groups is one slot shorter than the basic pitch may alternately be disposed in a longitudinal direction of the three-phase coil, group, and in another winding portion (for example, later-described first and third turns), the pitch of each of the linear portion groups may be the basic pitch.

According to (1) above, the linear portions of any two phases of the three phases are disposed in mixture in every other slots of the stator core, and thus, torque variation among the phases during rotor rotation is curbed, enabling eliminating rotating torque unevenness. Therefore, use of the stator coil enables provision of a high-quality rotating electrical machine.

According to (2) above, in the part corresponding to the boundary portion between the first half portion and the second half portion of the number of turns of the three-phase coil group, merely increasing or decreasing the pitch of each of the linear portion groups by one slot relative to the basic pitch enables easily obtaining a stator coil in which linear portions of any two phases of three phases can be disposed in mixture in every other slots of a stator core.

According to (3) above, the long pitch portion in which the pitch of each of the linear portion groups is one slot longer than the basic pitch and the short pitch portion in which the pitch of each of the linear portion groups is one slot shorter than the basic pitch are alternately disposed over the entirety in the longitudinal direction of the three-phase coil group, enabling easily obtaining a stator coil in which linear portions of any two phases of three phases can be disposed in well-balanced mixture in every other slots of a stator core irrespective of the number of layers stacked in a radial direction of the stator core.

According to (4) above, in the winding portion at the center in the radial direction of the stator core, the long pitch portion in which the pitch of each of the linear portion groups is one slot longer than the basic pitch and the short pitch portion in which the pitch of each of the linear portion groups is one slot shorter than the basic pitch are alternately disposed in the longitudinal direction of the three-phase coil group, and in another winding portion, the pitch of each of the linear portion groups is the basic pitch, enabling easily obtaining a stator coil in which linear portions of any two phases of three phases can be disposed in well-balanced mixture in every other slots of a stator core irrespective of the number of layers stacked in a radial direction of the stator core.

DETAILED DESCRIPTION OF THE INVENTION

Figure 1:
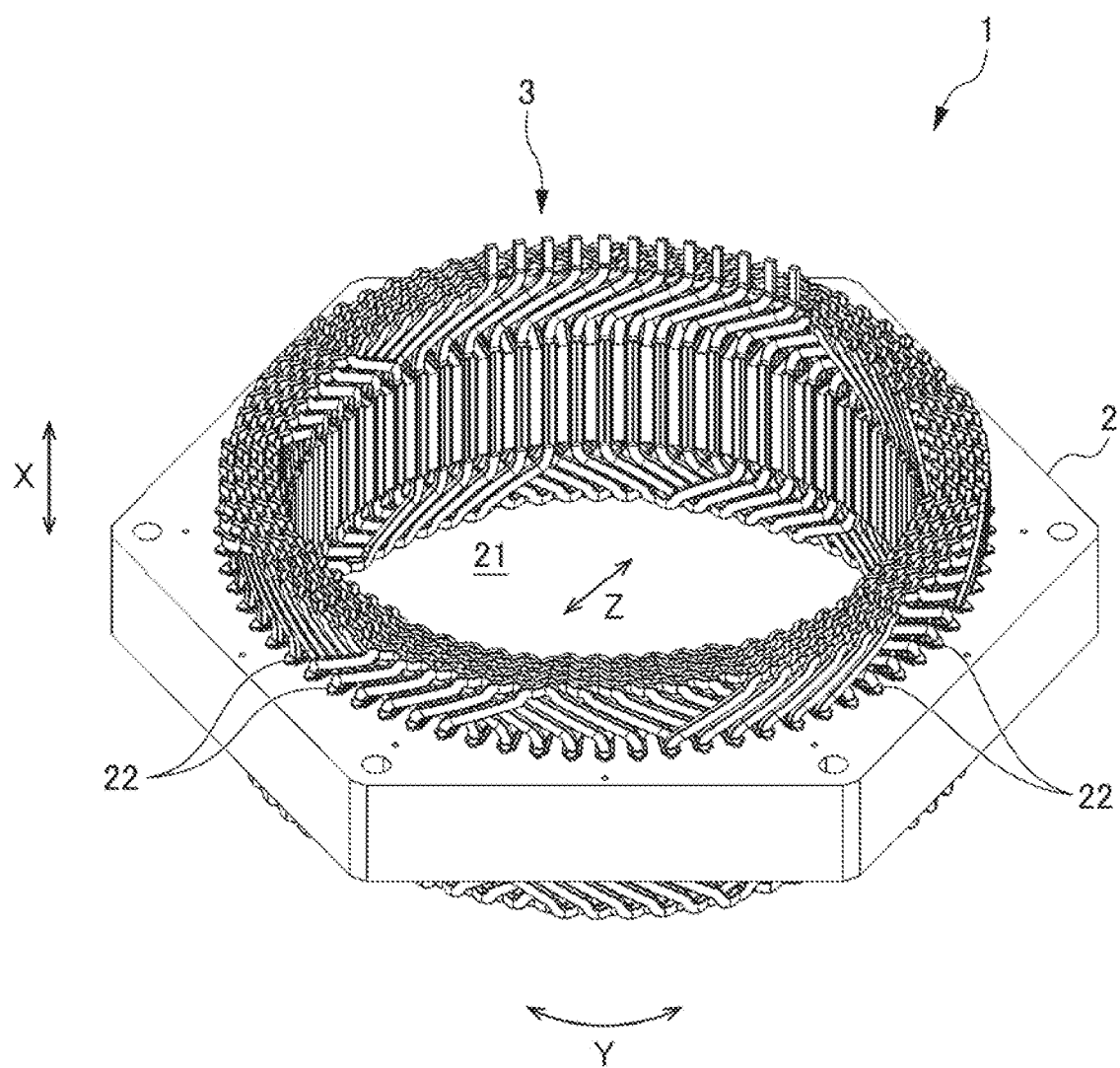
FIG. 1 is a perspective view illustrating a stator.

Embodiments of the present invention will be described in detail below with reference to the drawings. FIG. 1 is a perspective view of a stator 1. The stator 1 includes a stator core 2 and a stator coil 3.

The stator core 2 is formed in an annular shape including an axial hole 21 at a center, the axial hole 21 extending through the stator core 2 in an axial direction X, by a plurality of magnetic steel sheets stacked in the axial direction. On the inner circumferential side of the stator core 2, a plurality of slots 22 are arranged radially in a circumferential direction Y of the stator core 2. Each slot 22 is what is called an open slot and extends through the stator core 2 in the axial direction X of the stator core 2 and opens in a radial direction Z of the stator core 2 toward the axial hole 21. Although the stator core 2 indicated in the present embodiment includes 72 slots 22, the number of slots 22 is not limited. A rotating electrical, machine is configured by a non-illustrated rotor being rotatably disposed in the axial hole 21 of the stator core 2.

The stator coil 3 is inserted into the slots 22 from the axial hole 21 side of the stator core 2 and is wound in a plurality of turns in the circumferential direction Y of the stator core 2. Consequently, the stator coil 3 is stacked in a plurality of layers in the radial direction Z of the stator core 2 and mounted.

Figure 2:
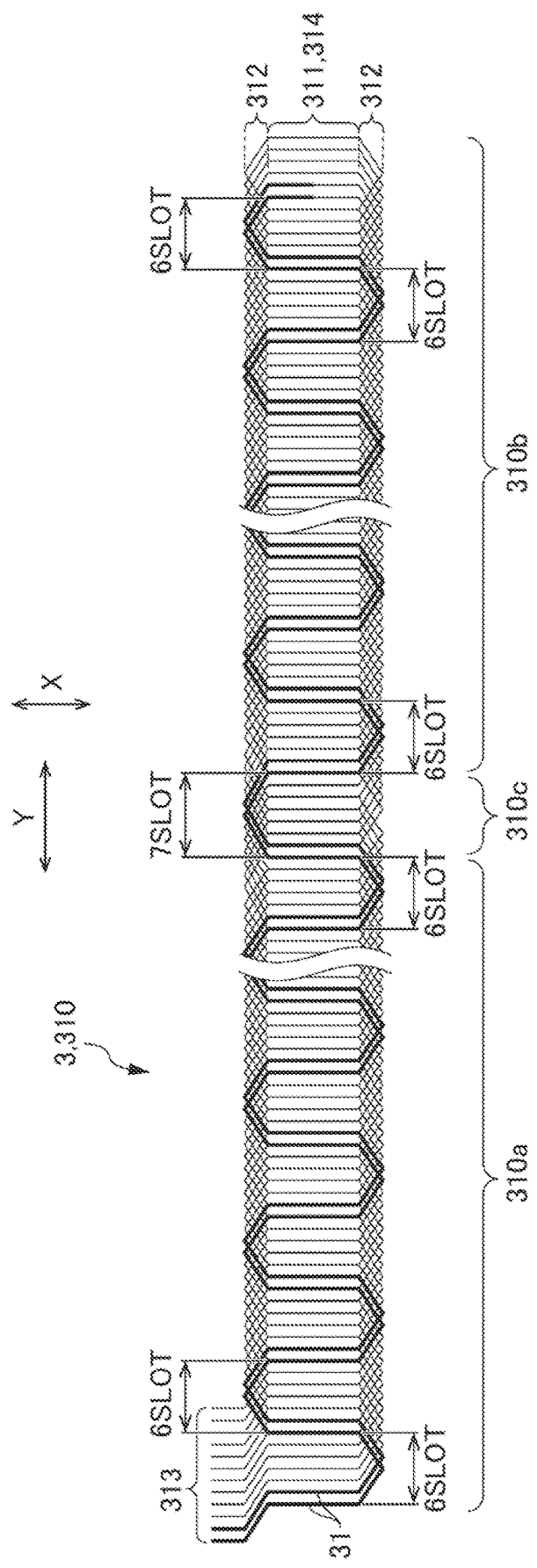
FIG. 2 is a front view illustrating a stator coil according to a first embodiment.

FIG. 2 is a plan view illustrating the stator coil 3 according to the first embodiment. The stator coil 3 is configured by wave-winding coils each formed by a linear conductor formed of, e.g., copper being consecutively bent along the circumferential direction Y of the stator core 2 and thus shaped into a wavelike form. When the continuous wave-winding coils 31 are set in the slots 22 of the stator core 2, the continuous wave-winding coils 31 have no need for a technique for forming each coil in such a manner that the coil is divided in a plurality of segments and welding ends of the coil segments after the coil is inserted in slots, which is a main stream method on the general public, and thus, have no needs for, for example, using high-purity copper for the coils so that the coils can endure thermal processing of welding parts. Therefore, use of recycled copper material containing impurities becomes possible, which enables contribution to achievement of cyclic use of resources. In addition, the wave-winding coils 31 require no welding, enabling reduction in weight of the coils and thus enabling reduction in weight of a rotating electrical machine using the coils. Where the rotating electrical machine is mounted in a hybrid vehicle, weight of the vehicle is reduced, enabling carbon dioxide reduction and thus enabling reduction of an adverse effect on the global environment.

The stator coil 3 includes a plurality of wave-winding coils 31 of three phases, a U-phase, a V-phase and a W-phase. A pair of wave-winding coils 31 (U1, U2, V1, V2, W1, W2) is provided for each of the respective phases. Therefore, the stator coil 3 is formed of a total of six continuous wave-winding coils 31 of the three phases, the U-phase, the V-phase and the W-phase. In FIG. 2, only two wave-winding coils 31, 31 of a same phase from among the six wave-winding coils 31 are indicated in bold.

Figure 3:
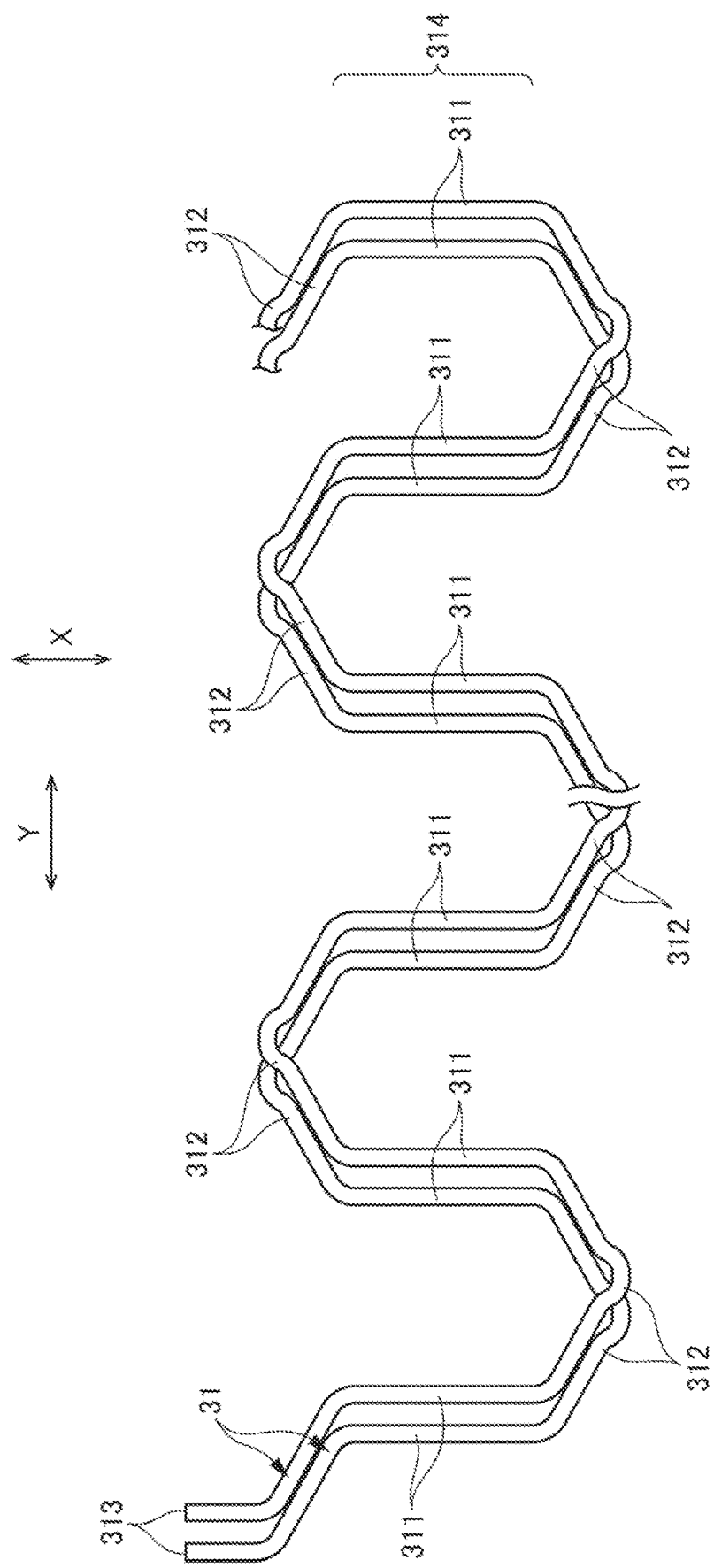
FIG. 3 is a front view illustrating a part of a coil of one phase of the stator coil.

FIG. 3 is a front view illustrating parts of two wave-winding coils 31 forming one phase of the stator coil 3. Each of the wave-winding coils 31 includes a plurality of linear portions 311 extending in the axial direction X, which are inserted into slots 22 of the stator core 2, coil end portions 312, 312 that alternately join one end portions of two adjacent linear portions 311, 311 to each other and other end portions of two adjacent linear portions 311, 311 to each other in a mountain-like shape, and terminals 313, 313 at opposite edge portions, which serve as an input terminal and an output terminal. In the wave-winding coils 31, 31 illustrated in FIG. 3, only the terminals 313 on the one edge portion side of the terminals 313, 313 of the opposite edge portions are illustrated.

The plurality of linear portions 311 of each of the wave-winding coils 31 extend linearly along the axial direction X of the stator core 2 and are arranged in parallel along the circumferential direction Y of the stator core 2 with a predetermined distance from one another. The respective linear portions 311, 311 of the two wave-winding coils 31, 31 forming one phase are arranged side by side with respective positions shifted from each other in the circumferential direction Y by a distance corresponding to a distance between two slots 22, 22 that are adjacent to each other in the circumferential direction Y of the stator core 2. The plurality of linear portions 311 in the two wave-winding coils 31, 31 of one phase form a linear portion group 314 of the phase.

The wave-winding coils 31 of three phases, the U-phase, the V-phase and the W-phase, have a same configuration except where respective linear portion groups 314 have different pitches as described later. The stator coil 3 is formed by arranging side by side two wave-winding coils 31 (U1, U2, V1, V2, W1, W2) for each phase in parallel to each other with respective positions shifted from each other in the circumferential direction Y. The stator coil 3 is configured by a continuous three-phase coil group 310 in which the linear portions 311 in the respective linear portion groups 314 of the total of six wave-winding coils 31 of the three phases are arranged, side by side in order in the circumferential direction Y.

The three-phase coil group 310 is folded back at a center portion in a longitudinal direction along the circumferential direction Y of the stator core 2 in such a manner that the terminals 313, 313 at the opposite edge portions become close to each other. As a result, of the three-phase coil group 310 being folded back, the linear portions 311, 311 are stacked in two layers in the radial direction Z of the stator core 2. As illustrated in FIG. 2, the twelve terminals 313 of the six wave-winding coils 31 are arranged at one edge portion in the longitudinal direction of the three-phase coil group 310 with a constant distance from one another.

Figure 4:
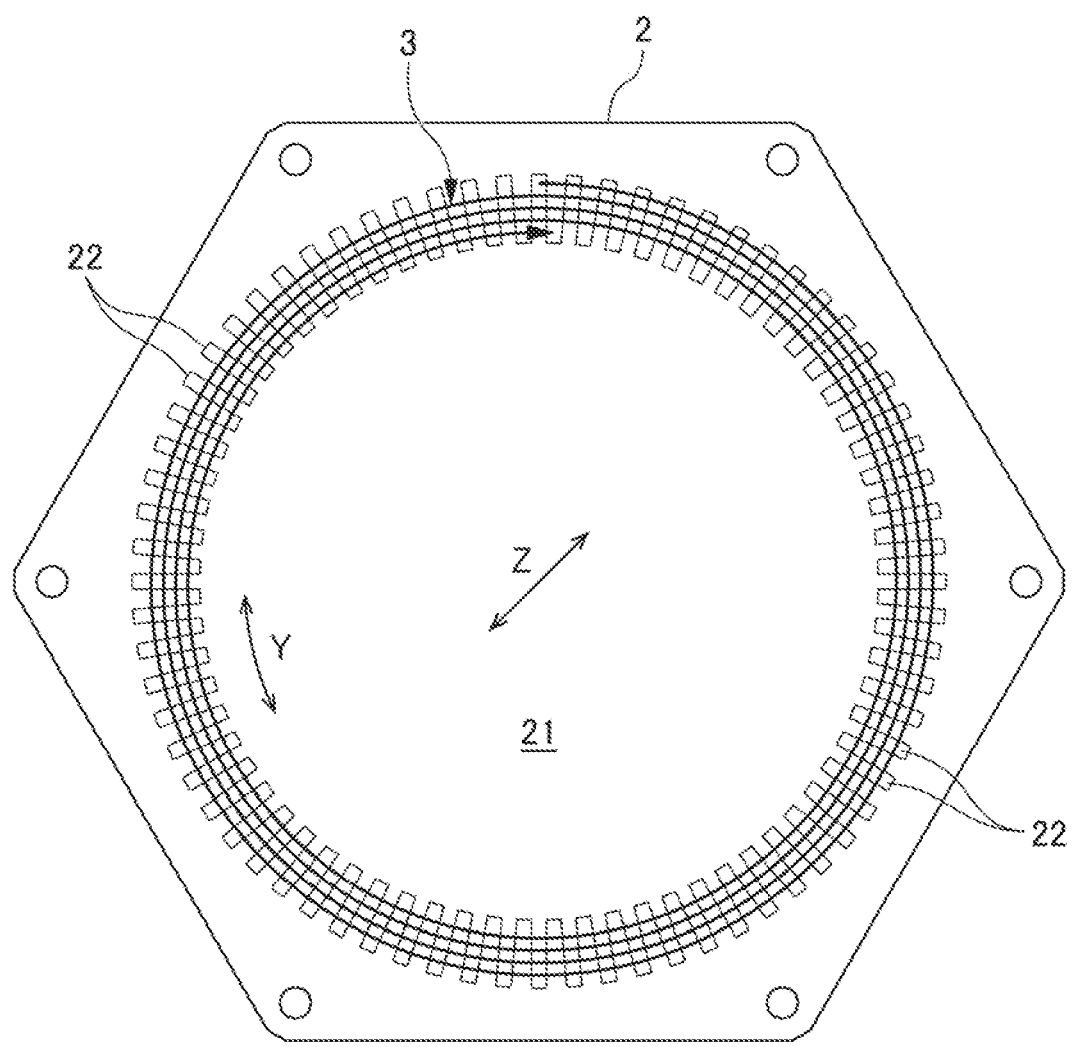
FIG. 4 is a plan view schematically illustrating the stator coil according to the first embodiment that is wound in four turns on a stator core.
Figure 7:
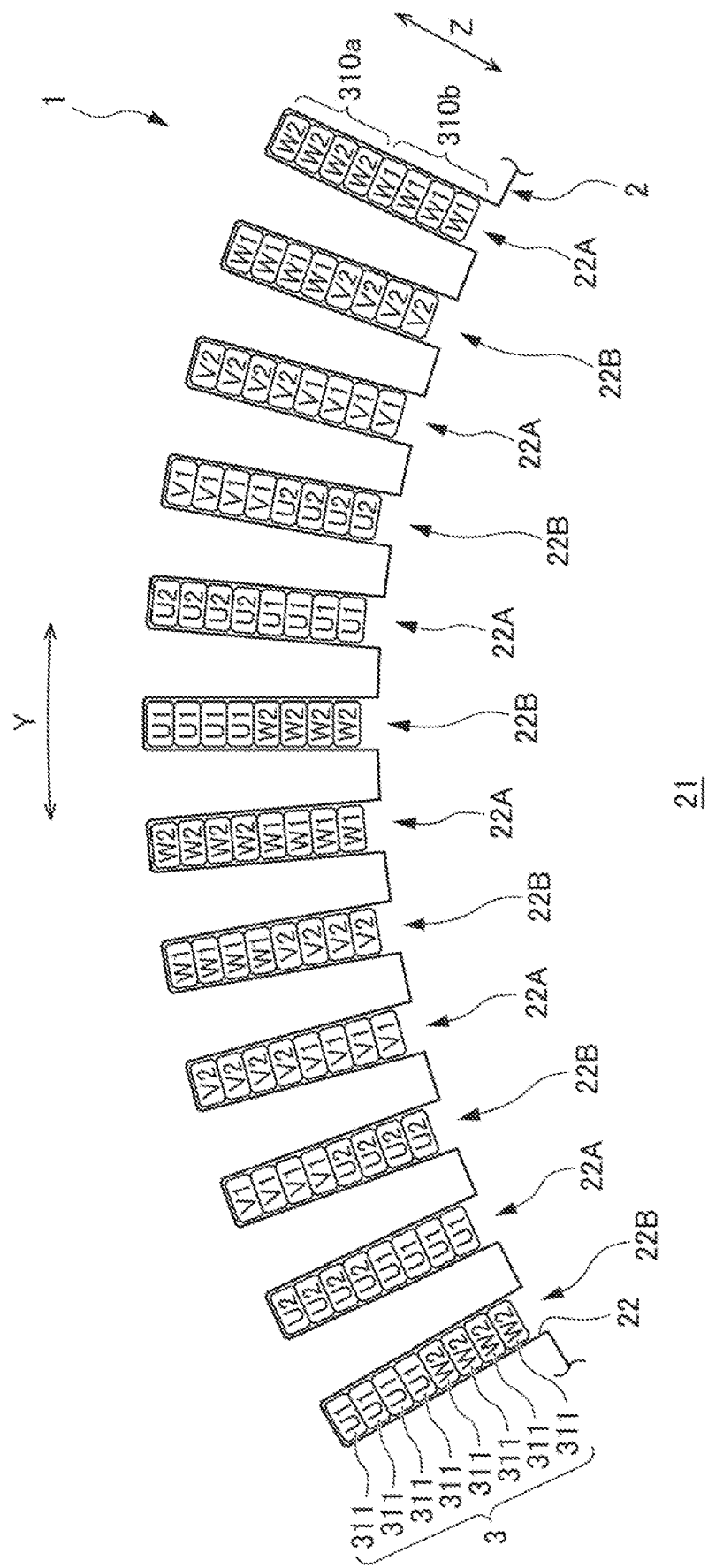
FIG. 7 is a diagram illustrating the linear portions of the stator coil according to the first embodiment that are inserted in the slots.

A length in the longitudinal direction of the folded-back three-phase coil group 310 is a length enough for the three-phase coil group 310 to be mounted in four turns in the slots 22 of the stator core 2. Therefore, as illustrated in FIG. 4, the stator coil 3 is wound in four turns with the linear portions 311 inserted in the respective slots 22, along the circumferential direction Y of the stator core 2. Consequently, as illustrated in FIG. 7 referred to later, in each slot 22 of the stator core 2, linear portions 311 of eight layers (two layers×four turns) are stacked along the radial direction Z.

Here, as illustrated in FIG. 2, in the three-phase coil group 310, in a part corresponding to a boundary portion 310c between an outer circumferential-side coil group 310a corresponding to two turns forming a first half portion of the number of turns around the stator core 2 and an inner circumferential-side coil group 310b corresponding to two turns forming a second half portion of the number of turns, a pitch of linear portions 311 in the linear portion group 314 is set to be one slot longer than a basic pitch of linear portions 311 in other parts of the linear portion group 314. In more detail, while the pitch of linear portions 311 in the linear portion group 314 of each phase of the outer circumferential-side coil group 310a and the inner circumferential-side coil group 310b is set to be the basic pitch, the pitch of linear portions 311 in the linear portion group 314 of each phase at the part corresponding to the boundary portion 310c is set to be the basic pitch plus one slot.

Note that the three-phase coil group 310 of the stator coil 3 according to the first embodiment is wound in four turns around the slots 22 of the stator core 2, and four layers of linear portions 311 are stacked on each of the outer circumferential side and the inner circumferential side in the radial direction Z of the slots 22. Therefore, the boundary portion 310c is a part in which a total of twelve linear portions 311 of the respective linear portion groups 314 of the wave-winding coils 31 of the three phases and coil end portions 312 at one part (one set) corresponding to a point of transition of the turn between two turns of the outer circumferential-side coil group 310a and two turns of the inner circumferential-side coil group 310b are arranged side by side.

Figure 5:
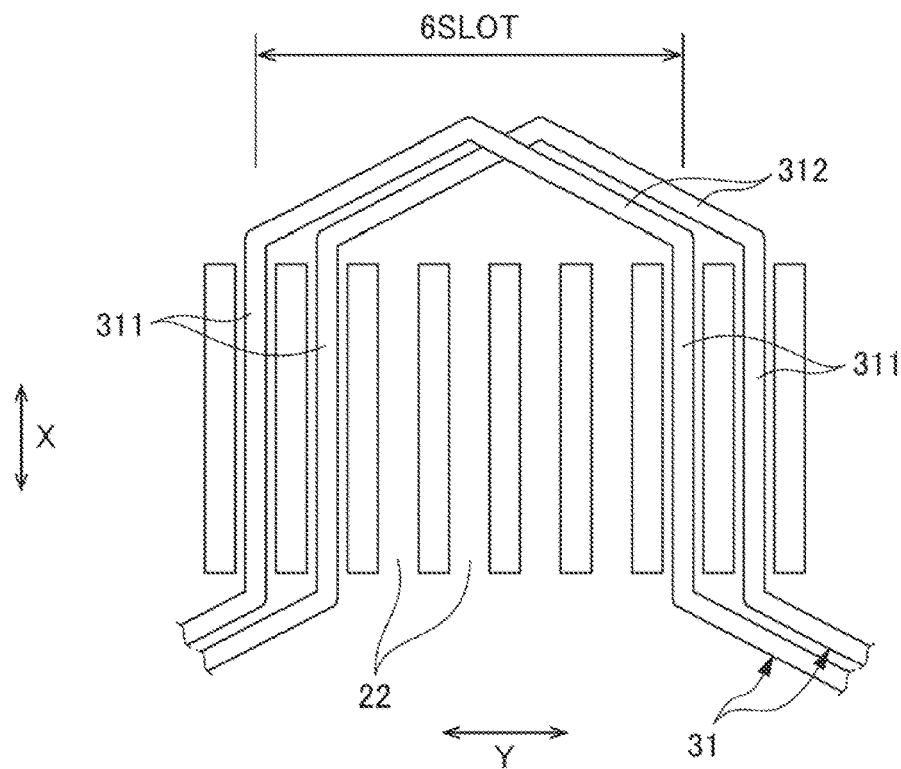
FIG. 5 is a diagram illustrating a basic pitch of the stator coil.

The basic pitch will be described with reference to FIG. 5. FIG. 5 illustrates two adjacent linear portions 311, 311 and coil end portions 312, 312 of two wave-winding coils 31, 31 of one phase. In the stator coil 3, the basic pitch is set to a six-slot (6-SLOT) pitch. In other words, adjacent linear portions 311, 311 of a same wave-winding coil 31 is inserted into every sixth slots 22. Five slots 22 are disposed between linear portions 311, 311 adjacent to each other in the circumferential direction Y of the stator core 2 in a same wave-winding coil 31. Linear portions 311, 311 arranged side by side in two wave-winding coils 31, 31 forming one phase are inserted into adjacent slots 22, 22, respectively.

Figure 6:
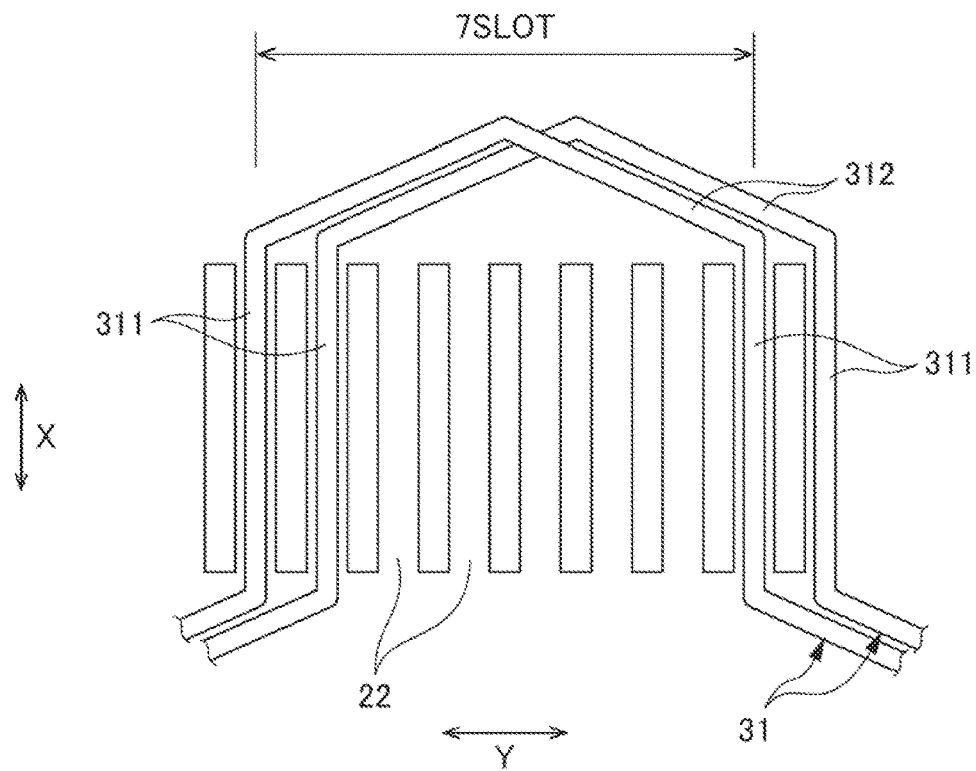
FIG. 6 is a diagram illustrating a relationship between linear portions and slots where a pitch of the stator coil is one slot longer than the basic pitch.

FIG. 6 illustrate a case where the pitch is one slot longer than the basic pitch. In other words, in the wave-winding coil 1, each of pitches of linear portions 311, 311 in the part corresponding to the boundary portion 310c is set to a seven-slot (7-SLOT) pitch. In other words, adjacent, linear portions 311, 311 of a same wave-winding coil 31 are inserted into every seventh slots 22. Six slots 22 are disposed between linear portions 311, 311 adjacent to each other in the circumferential direction Y of the stator core 2 in a same wave-winding coil 31. Linear portions 311, 311 arranged side by side in two wave-winding coils 31, 31 of one phase are inserted into adjacent slots 22, 22, respectively. The coil end portions 312 are stretched to a length corresponding to seven slots in the circumferential direction Y of the stator core 2 relative to the coil end portions 312 of the basic pitch illustrated in FIG. 5.

FIG. 7 illustrates the linear portions 311 in the slots 22 when the stator coil 3 according to the first embodiment, which is illustrated in FIG. 2, is wound in four turns around the stator core 2. In the stator coil 3, in each of the outer circumferential-side coil group 310a of two turns forming the first half portion and the inner circumferential-side coil group 310b of two turns forming the second half portion, linear portions 311 of a same phase are stacked in order on a four layer-by-four layer basis in each slot 22. However, because the pitch of linear portions 311 in the parts of the linear portion groups 314, the parts corresponding to the boundary portion 310c between the outer circumferential-side coil group 310a and the inner circumferential-side coil group 310b is a seven-slot pitch that is one slot longer than the basic pitch, the phases of the linear portions 311 of the four-layers in the outer circumferential-side coil group 310a and the phases of the linear portions 311 of the four layers of the inner circumferential-side coil group 310b are shifted from each other by one slot in the circumferential direction Y of the stator core 2.

More specifically, on the inner circumferential side of a slot 22 in which four layers of linear portions 311 of a U1-phase in the outer circumferential-side coil group 310a are stacked, four layers of linear portions 311 of a W2-phase in the inner circumferential-side coil group 310b are stacked. On the inner circumferential side of a slot 22 in which four layers of linear portions 311 of a U2-phase in the outer circumferential-side coil group 310a are stacked, four layers of linear portions 311 of the U1-phase in the inner circumferential-side coil group 310b are stacked. On the inner circumferential side of a slot 22 in which four layers of linear portions 311 of a V1-phase in the outer circumferential-side coil group 310a are stacked, four layers of linear portions 311 of the U2-phase in the inner circumferential-side coil group 310b are stacked. On the inner circumferential side of a slot 22 in which four layers of linear portions 311 of a V2-phase in the outer circumferential-side coil group 310a are stacked, four layers of linear portions 311 of the V1-phase in the inner circumferential-side coil group 310b are stacked. On the inner circumferential side of a slot 22 in which four layers of linear portions 311 of a W1-phase in the outer circumferential-side coil group 310a are stacked, four layers of linear portions 311 of the V2-phase in the inner circumferential-side coil group 310b are stacked. On the inner circumferential side of a slot 22 in which four layers of linear portions 311 of the W2-phase in the outer circumferential-side coil group 310a are stacked, four layers of linear portions 311 of the W1-phase in the inner circumferential-side coil group 310b are stacked. Subsequently the above arrangements of the linear portions 311 are repeated along the circumferential direction Y of the stator core 2.

Consequently, linear portions 311 of same phases (U1 and U2, V1 and V2, and W1 and W2) are accommodated in every other slots 22 (hereinafter referred to as "first slots 22A") from among the slots 22 of the stator core 2 in the order of U, V, W along the circumferential direction Y, and stacked in order in the radial direction Z of the stator core 2, respectively. On the other hand, in each of every other slots 22 (hereinafter referred to as "second slots 22B") that are different from the first slots 22A from among the slots 22 of the stator core 2, linear portions 311 of two phases that are the same as two phases of linear portions 311 in first slots 22A, 22A disposed on opposite sides of the second slot 22B are accommodated and stacked in order in the radial direction Z of the stator core 2. The number of linear portions 311 stacked in each slot 22 is the same between the first slots 22A and the second slots 22B. The number of linear portions 311 in each second slot 22B is the same among the phases.

In the stator 1 with the stator coil 3 mounted by being wound in the slots 22 as described, linear portions 311 of each two phases (U1, U2, V1, V2, W1, W2) are divided in halves in the radial direction Z of respective slots 22 and inserted in the slots in such a manner as to be shifted from each other by one slot in the circumferential direction Y. Therefore, it is possible to avoid an arrangement in which linear portions 311 of a same phase are concentrated in two adjacent slots 22, 22. Since linear portions 311 of any two phases of the three phases are disposed in mixture in two adjacent slots 22, 22, torque variation among the phases during rotor rotation is curbed and rotating torque unevenness is thus eliminated. Therefore, use of the stator 1 with the stator coil 3 mounted enables configuring a high-quality rotating electrical machine.

Figure 8:
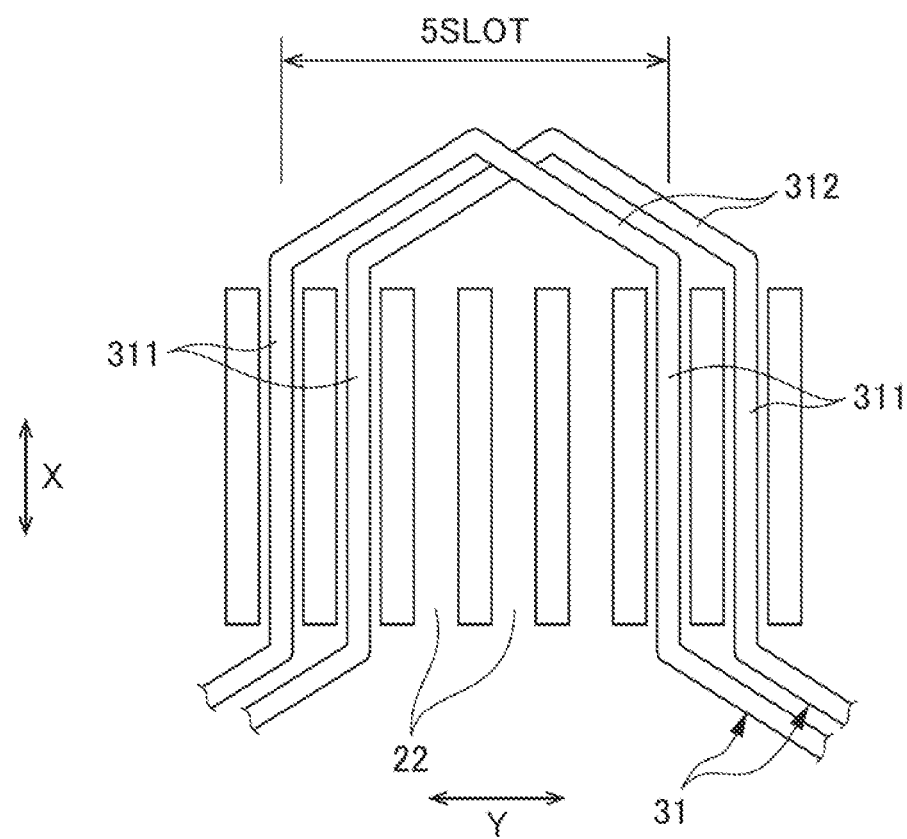
FIG. 8 is a diagram illustrating a relationship between the linear portions and the slots where the pitch of the stator coil is one slot shorter than the basic pitch.

The present invention is not limited to the case where the pitch of linear portions 311 in the part of the linear portion group 314, the part corresponding to the boundary portion 310c, is set to a seven-slot pitch that is one slot longer than the basic pitch that is a six-slot pitch. As illustrated in FIG. 8, even if the pitch of linear portions 311 in the parts of the linear portion groups 314, the parts corresponding to the boundary portion 310c, is set to a five-slot pitch that is one slot shorter than the basic pitch, effects that are similar to the above can be obtained. In the case of the five-slot pitch, four slots 22 are disposed between linear portions 311, 311 that are adjacent to each other in the circumferential direction Y of the stator core 2 in a same wave-winding coil 31. Coil end portions 312 are shrunk to a length corresponding to five slots along the circumferential direction Y of the stator core 2 relative to the coil end portions 312 of the basic pitch. In this case, the linear portions 311 of each two phases (U1, U2, V1, V2, W1, W2) in the inner circumferential-side coil group 310b are disposed in such a manner as to be shifted by one slot to the side opposite to that of FIG. 7 in the circumferential direction Y of the stator core 2, from the linear portions 311 of each two phases (U1, U2, V1, V2, W1, W2) in the outer circumferential-side coil group 310a.

Although the stator coil 3 according to the first embodiment is configured in such a manner as to be wound in four turns around the stator core 2, the number of turns around the stator core 2 is not limited to four. However, in the stator coil 3 according to the first embodiment, the pitch of linear portions 311 is different only in the part corresponding to the boundary portion 310c between the outer circumferential-side coil group 310a in the first half portion of the number of turns in the three-phase coil group 310 and the inner circumferential-side coil group 310b in the second half portion of the number of turns, and thus, if the number of turns is an odd number, the number of linear portions 311 of two different phases that are disposed in a same slot 22 is not the same between the two phases. Therefore, it is preferable that the stator coil 3 according to the first embodiment be wound in an even number of turns around the stator core 2.

Figure 9:
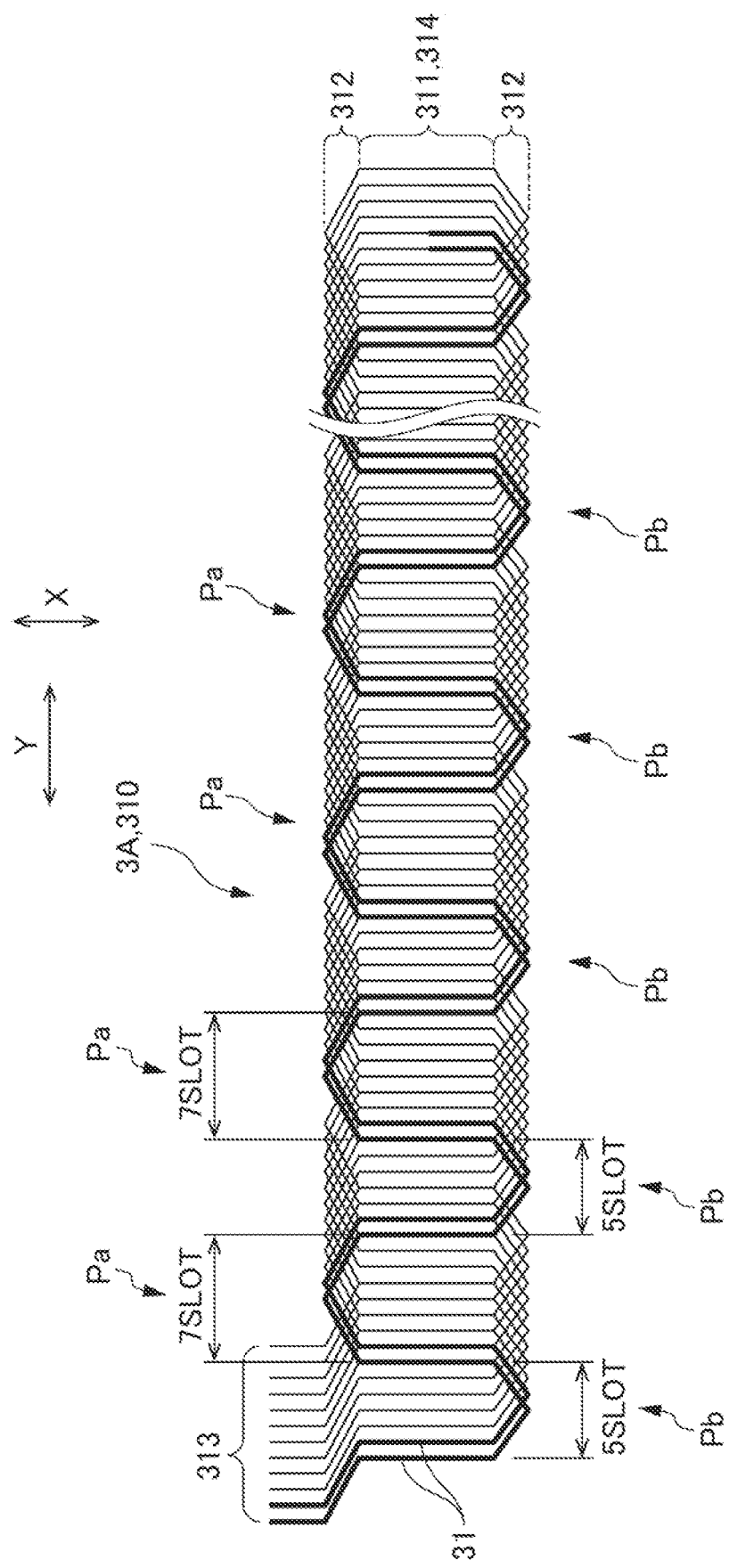
FIG. 9 is a front view illustrating a stator coil according to a second embodiment.

FIG. 9 is a plan view illustrating a stator coil 3A according to a second embodiment. Parts provided with reference numerals that are the same as those of the stator coil 3 according to the first embodiment indicate parts that are the same as those of the first embodiment, and thus, description of such parts will be omitted below by incorporation of the above description by reference. In FIG. 9, also, only two wave-winding coils 31, 31 of a same phase from among six wave-winding coils 31 are indicated in bold.

As illustrated in FIG. 9, in a three-phase coil group 310 of the stator coil 3A, long pitch portions Pa having a seven-slot pitch (see FIG. 6) obtained by increasing a pitch of linear portions 311 in each linear portion group 314 by one slot relative to a basic pitch (see FIG. 5) that is a six-slot pitch and short pitch portions Pb having a five-slot pitch (see FIG. 8) obtained by decreasing the pitch of linear portions 311 by one slot relative to the basic pitch are alternately disposed over an entirety in a longitudinal direction of the three-phase coil group 310. All of coil end portions 312 disposed on the terminal 313 side (the upper side in FIG. 9) of the three-phase coil group 310 are stretched to a length corresponding to seven slots along the circumferential direction Y of the stator core 2 relative to the coil end portions 312 in the case of the basic pitch and all of coil end portions 312 disposed on the non-terminal side (the lower side in FIG. 9) of the three-phase coil group 310 are shrunk to a length corresponding to five slots along the circumferential direction Y of the stator core 2 relative to the coil end portions 312 in the case of the basic pitch.

Figure 10:
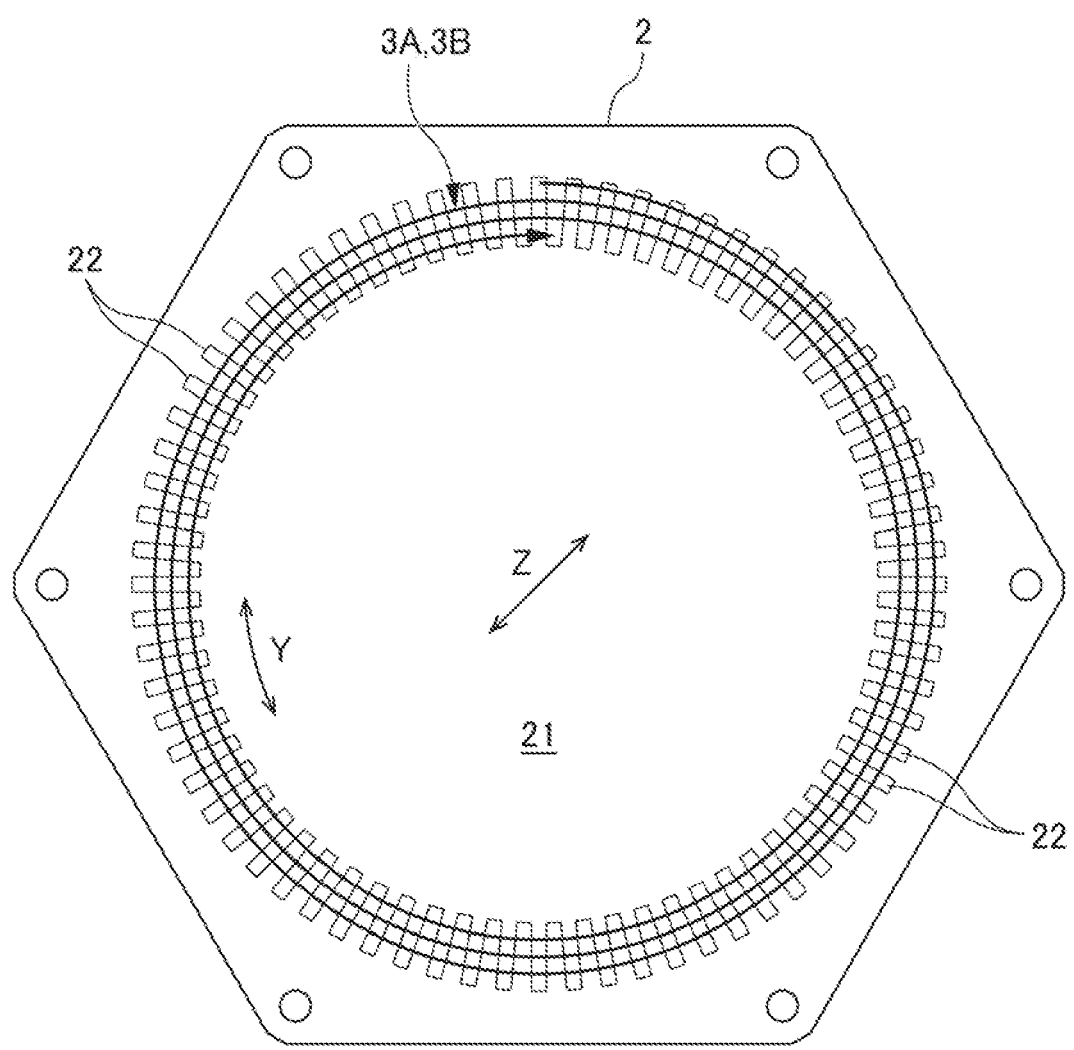
FIG. 10 is a plan view schematically illustrating the stator coil according to the second embodiment that is wound in three turns around a stator core.

The stator coil 3A according to the second embodiment is also folded back at a center portion in the longitudinal direction of the three-phase coil group 310 and a length in the longitudinal direction of the folded-back three-phase coil group 310 is a length enough for the three-phase coil group 310 to be mounted in three turns in slots 22 of the stator core 2. Therefore, as illustrated in FIG. 10, the stator coil 3A is wound in three turns along the circumferential direction Y while the linear portions 311 being inserted in the respective slots 22 of the stator core 2. Consequently, as illustrated in FIG. 11, six layers (two layers×three turns) of the linear portions 311 are stacked in a radial direction Z in each slot 22 of the stator core 2.

Figure 11:
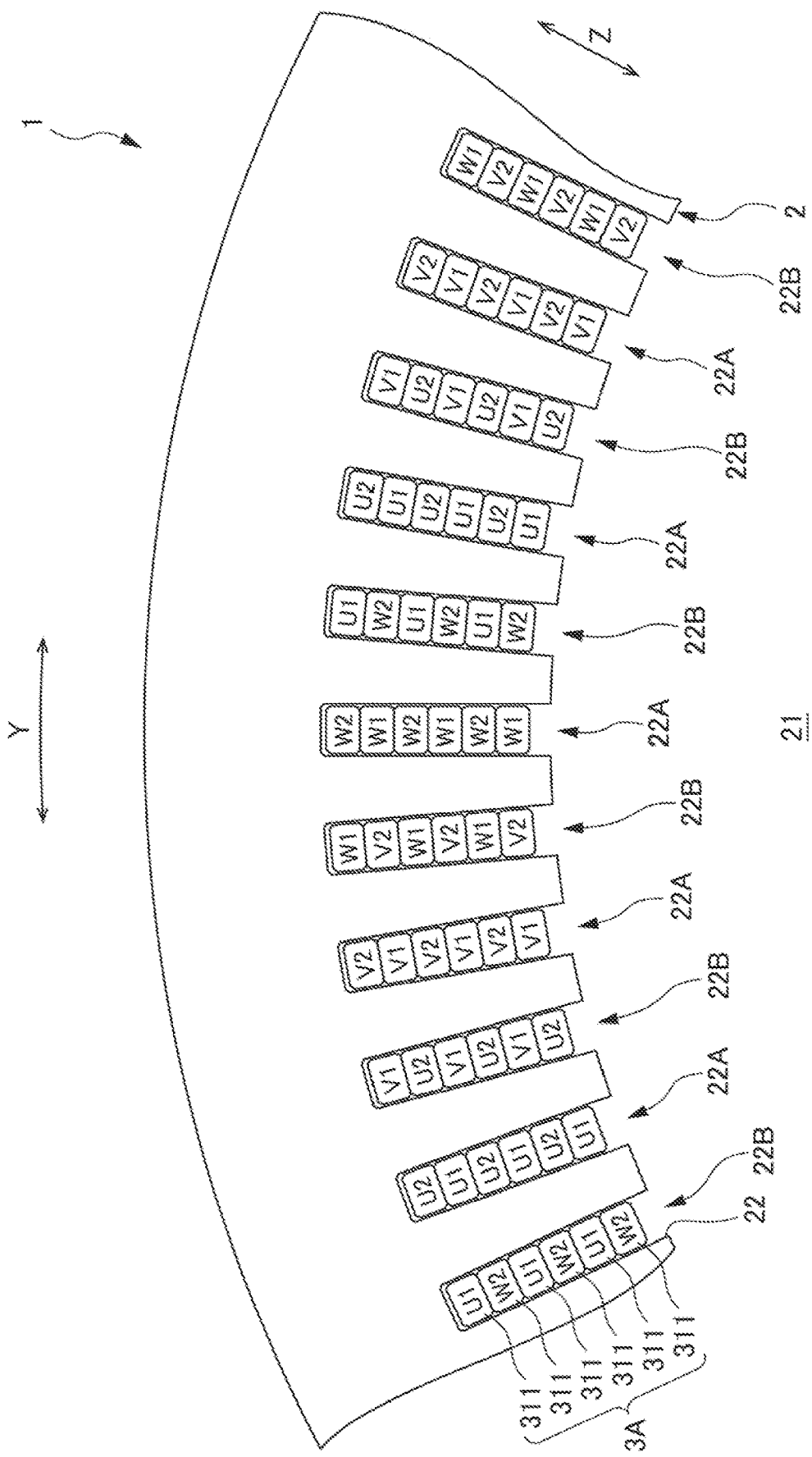
FIG. 11 is a diagram illustrating linear portions of the stator coil according to the second embodiment that are inserted in slots.

Since in the stator coil 3A, the long pitch portions Pa having a seven-slot pitch and the short pitch portions Pb having a five-slot pitch are alternately disposed along the longitudinal direction of the three-phase coil group 310, as illustrated in FIG. 11, six layers of linear portions 311 of phases that are the same (U1, U2, V1, V2, W1, W2) are accommodated and stacked in the radial direction Z in each first slot 22A. The linear portions 311 of phases that are the same (U1 and U2, V1 and V2, W1 and W2), the linear portions corresponding to six layers, are alternately disposed in the radial direction Z. More specifically, in each first slot 22A, three linear portions 311 of U1 and three linear portions 311 of U2 in a U-phase are alternately stacked in the radial direction Z, three linear portions 311 of V1 and three linear portions 311 of V2 in a V-phase are alternately stacked in the radial direction Z, or three linear portions 311 of W1 and three linear portions 311 of W2 in a W-phase are alternately stacked in the radial direction Z.

On the other hand, in each second slots 22B, linear portions 311 of two phases that are the same as two phases of linear portions 311 in first slots 22A on opposite sides of the second slot 223 are accommodated and stacked in the radial direction Z of the stator core 2. The linear portions 311 of two phases, the linear portions corresponding to six layers, in each second slot 22B are alternately disposed in the radial direction Z. More specifically, where the U-phase and the V-phase are provided in first slots 22A, 22A disposed on opposite sides of a second slot 22B, three linear portions 311 of V1 in the V-phase and three linear portions 311 of U2 in the U-phase are alternately stacked in the radial direction Z in the second slot 22b. Where the V-phase and the W-phase are provided in first slots 22A, 22A disposed on opposite sides of a second slot 22B, three linear portions 311 of W1 in the W-phase and three linear portions 311 of V2 in the V-phase are alternately stacked in the radial direction Z in the second slot 22B. Where the W-phase and the U-phase are provided in first slots 22A, 22A disposed on opposite sides of a second slot 22B, three linear portions 311 of U1 in the U-phase and three linear portions 311 of W2 in the W-phase are alternately stacked in the radial direction Z in the second slot 22B. Note that the number of linear portions 311 stacked in each slot 22 is the same between the first slots 22A and the second slots 22B. The number of linear portions 311 in each second slot 22B is the same among the phases.

In a stator 1 with the stator coil 3A mounted by being wound in the slots 22 as described above, as illustrated in FIG. 11, the linear portions 311 of each two phases (U1, U2, V1, V2, W1, W2) are inserted in the radial direction Z of respective slots in such a manner as to be shifted in the circumferential direction Y in a well-balanced manner. Therefore, it is possible to avoid an arrangement in which linear portions 311 of a same phase are concentrated in two adjacent slots 22, 22. Since linear portions 311 of any two phases of the three phases are disposed in mixture in two adjacent slots 22, 22, torque variation among the phases during rotor rotation is curbed and rotating torque unevenness is thus eliminated. Therefore, use of the stator 1 with the stator coil 3A mounted enables configurating a high-quality rotating electrical machine.

Although the stator coil 3A according to the second embodiment is configured in such a manner as to be wound in three turns around the stator core 2, the number of turns around the stator core 2 is not limited to three. In addition, the number of turns around the stator core 2 of the stator coil 3A according to the second embodiment enables linear portions 311 of two phases to be disposed in a well-balanced manner in each second slot 22B irrespective of whether the number of turns is an even number or an odd number.

Figure 12:
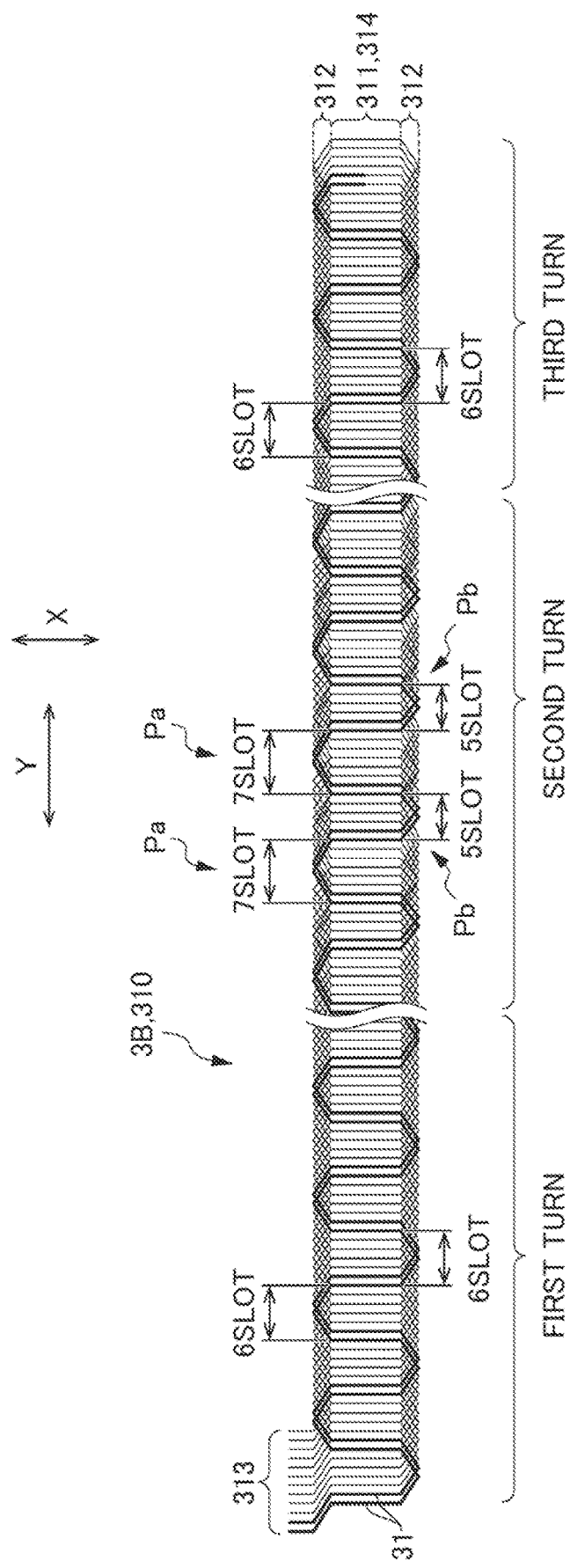
FIG. 12 is a front view illustrating a stator coil according to a third embodiment.

FIG. 12 is a plan view illustrating a stator coil 3B according to a third embodiment. Parts provided with reference numerals that are the same as those of the stator coil 3 according to the first embodiment indicate parts that are the same as those of the first embodiment, and thus, description of such parts will be omitted below by incorporation of the above description by reference. In FIG. 12, also, only two wave-winding coils 31, 31 of a same phase from among six wave-winding coils 31 are indicated in bold. As with the stator coil 3A, this stator coil 3B is also mounted on a stator core 2 by being wound in three turns around the stator core 2.

As illustrated in FIG. 12, in a three-phase coil group 310 of the stator coil 38, in a winding portion of a second turn corresponding to a center in a radial direction Z of the stator core 2 in the number of turns, three turns, of the three-phase coil group 310 around the stator core 2, a pitch of linear portions 311 in each of linear portion groups 314 is different from a pitch of linear portions 311 in each of the linear portion groups 314 in winding portions of the other winding portions of a first turn and a third turn.

In other words, in the three-phase coil group 310 of the stator coil 3B, the pitch of linear portions 311 in each of the linear portion groups 314 in the winding portion of the first turn on the most outer circumferential side and the winding portion of the third turn on the most inner circumferential side is set to a basic pitch (see FIG. 5) that is a six-slot pitch. On the other hand, in the pitch of linear portions 311 in each of the linear portion groups 314 in the winding portion of the second turn, long pitch portions Pa having a seven-slot pitch (see FIG. 6) that is one slot longer than the basic pitch and short pitch portions Pb having a five-slot pitch (see FIG. 8) that is one slot shorter than the basic pitch are alternately disposed in a longitudinal direction of the three-phase coil group 310. All of coil end portions 312 disposed on the terminal 313 side (the upper side in FIG. 12) in the three-phase coil group 310 of the second turn are stretched to a length corresponding to seven slots along a circumferential direction Y of the stator core 2 relative to coil end portions 312 in the case of the basic pitch, and all of coil end portions 312 disposed on the non-terminal 313 side (the lower side in FIG. 12) are shrunk to a length corresponding to five slots along the circumferential direction Y of the stator core 2 relative to the coil end portions 312 in the case of the basic pitch.

As with the stator coil 3A, as illustrated in FIG. 10, the stator coil 3B according to the third embodiment is wound in three turns along the circumferential direction Y while the linear portions 311 being inserted in the respective slots 22 of the stator core 2. Consequently, as illustrated in FIG. 13, six layers (two layers×three turns) of the linear portions 311 are stacked along the radial direction Z in each of the slots 22 of the stator core 2.

Figure 13:
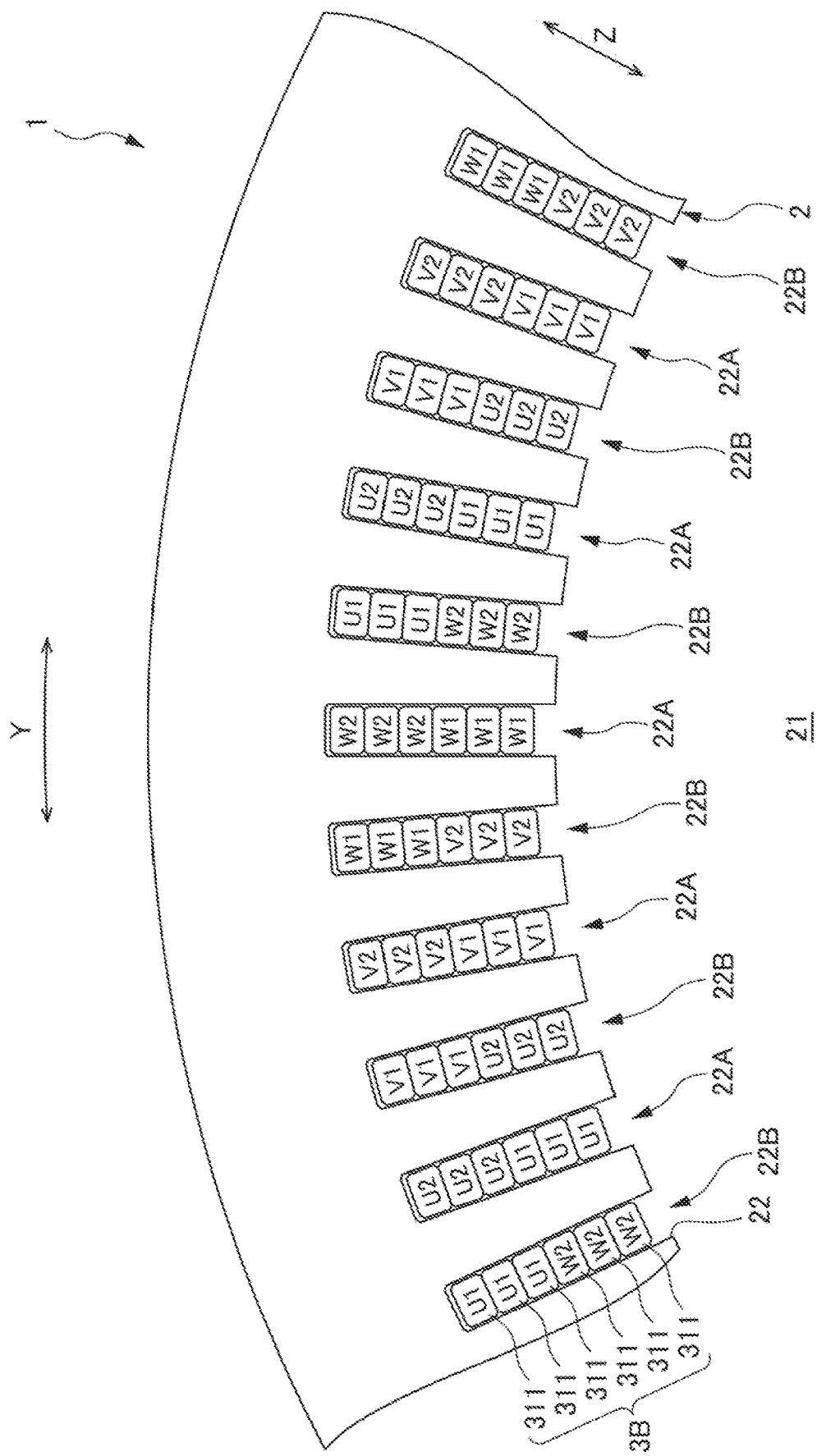
FIG. 13 is a diagram illustrating linear portions of the stator coil according to the third embodiment that are inserted in slots.

In the stator coil 3B, the long pitch portions Pa having a seven-slot pitch and the short pitch portions Pb having a five-slot pitch are alternately disposed along the longitudinal direction of the three-phase coil group 310 of the second turn disposed at the center in the radial direction Z of the stator core 2, and thus, as illustrated in FIG. 13, in each first slot 22A, six layers of linear portions 311 of phases that are the same (U1, U2, V1, V2, W2, W2) are accommodated and stacked in order on a three layer-by-three layer basis in the radial direction Z. More specifically, in each first slot 22A, three linear portions 311 of U2 and three linear portions 311 of U1 in a U-phase are stacked in order, in the radial direction Z, three linear portions 311 of V2 and three linear portions 311 of V1 in a V-phase are stacked in order in the radial direction Z, or three linear portions 311 of W2 and three linear portions 311 of W1 in a W-phase are stacked in order in the radial direction Z.

On the other hand, in each second slot 223, linear portions 311 of two phases that are the same as two phases of linear portions 311 in first slots 22A on opposite sides of the second slot 223 are accommodated and stacked in order on a three layer-by-three layer basis in the radial direction 2 of the stator core 2. More specifically, where the U-phase and the V-phase are provided in first slots 22A, 22A disposed on the opposite sides of a second slot 223, three linear portions 311 of V1 in the V-phase and three linear portion 311 of U2 in the U-phase are stacked in order in the radial direction Z in the second slot 22B. Where the V-phase and the W-phase are provided in first slots 22A, 22A disposed on opposite sides of a second slot 223, three linear portions 311 of W1 in the W-phase and three linear portions 311 of V2 in the V-phase are stacked in order in the radial direction Z in the second slot 22B. Where the W-phase and the U-phase are provided in first slots 22A, 22A on opposite sides of a second slot 22B, three linear portions 311 of U1 in the U-phase and three linear, portions 311 of W2 in the W-phase are stacked in order in the radial direction 7, in the second slot 22B. Note that, the number of linear portions 311 stacked in each slot 22 is the same between the first slots 22A and the second slots 223. The number of linear portions 311 in each second slot 22B is the same among the phases.

In a stator 1 in which the stator coil 3B is mounted by being wound in the slots 22 as described above, as illustrated in FIG. 13, linear portions 311 of each two phases (U1, U2, V1, V2, W1, W2) are inserted in such a manner that linear portions 311 on the outer circumferential side and linear portions 311 on the inner circumferential side are shifted from each other by one slot in the circumferential direction Y with center portions in the radial direction Z of the slots 22 as boundaries. Therefore, it is possible to avoid an arrangement in which linear portions 311 of a same phase are concentrated in two adjacent slots 22, 22. Since linear portions 311 of any two phases of the three phases are disposed in mixture in two adjacent slots 22, 22, torque variation among the phases during rotor rotation is curbed and rotating torque unevenness is thus eliminated. Therefore, use of the stator 1 with the stator coil 3B mounted enables configuring a high-quality rotating electrical machine.

Although the stator coil 3B according to the third embodiment is configured to be wound in three turns around the stator core 2, as with the stator coil 3A according to the second embodiment, the number of turns around the stator core 2 is not limited to three. However, in the stator coil 3B according to the third embodiment, in order for the pitch of linear portions 311 in the winding portion corresponding to the center in the radial direction Z of the stator core 2 to be different from the others, the number of turns is limited to odd numbers of turns that provide a winding portion corresponding to the center in the radial direction Z of the stator core 2.

As above, the present invention provides the following effects. In other words, a stator coil 3, 3A, 3B includes a continuous three-phase coil group 310 including a linear portion group 314 in which linear portions 311 are arranged side by side in units of two adjacent slots 22, 22 of slots of a stator core 2 for each of three phases, a U-phase, a V-phase and a W-phase, the linear portions in the linear portion groups 314 of the respective phases being arranged side by side in order in the three-phase coil group 310, the stator coil 3, 3A, 3B being mounted on the stator core 2 by being wound in a plurality of layers along a circumferential direction Y of the stator core 2, and in each of first slots 22A that are every other slots from among the slots 22 of the stator core 2, the linear portions 311 of a same phase are accommodated in order and stacked in a radial direction Z of the stator core 2, and in each of second slots 22B that are every other slots different from the first slots 22A from among the slots 22 of the stator core 2, the linear portions 311 of two phases that are the same as two phases of linear, portions 331 in the first slots 22K, 22A on opposite sides of the second slot 22B are accommodated in a number of layers stacked, the number being equal to a number of layers stacked in the first slots 22A, and stacked in the radial direction Z of the stator core 2. Accordingly, the linear portions 311 of any two phases of the three phases are disposed in mixture in every other slots of the stator core 2, and thus, torque variation among the phases during rotor rotation is curbed and rotating torque unevenness is thus eliminated. Therefore, use of the stator coil 3, 3A, 3B enables configurating a high-quality rotating electrical machine.

In the stator coil 3 according to the first embodiment, in the part corresponding to the boundary portion 310c between the outer circumferential-side coil group 310a in the first half portion of the number of turns of the three-phase coil group 310 around the stator core 2 and the inner circumferential-side coil group 310b in the second half portion of the number of turns, the pitch of each of the linear portion groups 314 is one slot longer or shorter than the basic pitch of each of the linear portion groups 314 in another part. Accordingly, in the part corresponding to the boundary portion 310c between the first, half portion and the second half portion of the number of turns of the three-phase coil group 310, merely increasing or decreasing the pitch of each of the linear portion groups 314 by one slot relative to the basic pitch enables easily obtaining a stator coil 3 in which linear portions 311 of any two phases of the three phases can be disposed in mixture in every other slots 22 of the stator core 2.

In the stator coil 3A according to the second embodiment, the long pitch portions Pa in which the pitch of each of the linear portion groups 314 is one slot longer than the basic pitch and the short pitch portions Pb in which the pitch of each of the linear portion groups 314 is one slot shorter than the basic pitch are alternately disposed over an entirety in the longitudinal direction of the three-phase coil group 310. Accordingly, it is possible to easily obtain a stator coil 3A in which linear portions 311 of any two phases of three phases can be disposed in well-balanced mixture in every other slots 22 of a stator core 2 irrespective of the number of layers stacked in a radial direction Z of the stator core 2.

In the stator coil 3B according to the third embodiment, in the second turn that is the winding portion at the center in the radial direction Z of the stator core 2 in the number of turns of the three-phase coil group 310 around the stator core 2, the long pitch portions Pa having a seven-slot pitch in which the pitch of each of the linear portion groups 314 is one slot longer than the basic pitch that is a six-slot pitch, and the short pitch portions Pb having a five-slot pitch in which the pitch of each of the linear portion groups 314 is one slot: shorter than the basic pitch are alternately disposed in the longitudinal direction of the three-phase coil group 310, and in each of the first and third turns that are the other winding portions, the pitch of each of the linear portion groups 314 is the basic pitch. Accordingly, it is possible to easily obtain a stator coil 3B in which linear portions 311 of any two phases of three phases can be disposed in a well-balanced mixture in every other slots 22 of a stator core 2 irrespective of the number of layers stacked in a radial direction Z of the stator core 2.

EXPLANATION OF REFERENCE NUMERALS 2 stator core
22 slot
22A first slot
22B second slot
3, 3A, 3B stator coil
310 three-phase coil group
310a outer circumferential-side coil group (first half portion)
310b inner circumferential-side coil group (second half portion)
310c boundary portion
311 linear portion
314 linear portion group
Pa long pitch portion
Pb short pitch portion
y circumferential direction of stator core
Z radius direction of stator core

What is claimed is:

1. A stator coil comprising a continuous three-phase coil group including a linear portion group in which linear portions are arranged side by side in units of two adjacent slots of slots of a stator core for each of three phases, the linear portions in the linear portion groups of the respective phases being arranged side by side in order in the continuous three-phase coil group, the stator coil being mounted on the stator core by being wound in a plurality of layers along a circumferential direction of the stator core,
wherein in each of first slots that are every other slots from among the slots of the stator core, the linear portions of a same phase are accommodated in order and stacked in a radial direction of the stator core, and in each of second slots that are every other slots different from the first slots from among the slots of the stator core, the linear portions of two phases that are same as two phases of the linear portions in the first slots on opposite sides of the second slot are accommodated in a number of layers stacked, the number being equal to a number of layers stacked in the first slots, and stacked in the radial direction of the stator core,
wherein a long pitch portion in which a pitch of each of the linear portion groups is one slot longer than a basic pitch and a short pitch portion in which the pitch of each of the linear portion groups is one slot shorter than the basic pitch are alternately disposed over an entirety in a longitudinal direction of the three-phase coil group.

2. A stator coil comprising a continuous three-phase coil group including a linear portion group in which linear portions are arranged side by side in units of two adjacent slots of slots of a stator core for each of three phases, the linear portions in the linear portion groups of the respective phases being arranged side by side in order in the continuous three-phase coil group, the stator coil being mounted on the stator core by being wound in a plurality of layers along a circumferential direction of the stator core,
wherein in each of first slots that are every other slots from among the slots of the stator core, the linear portions of a same phase are accommodated in order and stacked in a radial direction of the stator core, and in each of second slots that are every other slots different from the first slots from among the slots of the stator core, the linear portions of two phases that are same as two phases of the linear portions in the first slots on opposite sides of the second slot are accommodated in a number of layers stacked, the number being equal to a number of layers stacked in the first slots, and stacked in the radial direction of the stator core,
wherein in a winding portion at a center in the radial direction of the stator core in a number of turns of the three-phase coil group around the stator core, a long pitch portion in which a pitch of each of the linear portion groups is one slot longer than a basic pitch and a short pitch portion in which the pitch of each of the linear portion groups is one slot shorter than the basic pitch are alternately disposed in a longitudinal direction of the three-phase coil group, and in another winding portion, the pitch of each of the linear portion groups is the basic pitch.

* * * * *